(12) United States Patent
Khare et al.

(10) Patent No.: US 8,762,504 B2
(45) Date of Patent: Jun. 24, 2014

(54) SYSTEM AND METHOD FOR CREATING NETWORKED SHORT RANGE ZONE THROUGH REMOTE DELIVERY OF SHORT RANGE PROXY SERVER ON A REMOTELY LOCATED MACHINE

(75) Inventors: Rajendra Kumar Khare, Bangalore (IN); Ravi Bhat, Bangalore (IN); Abhijit Das, Bangalore (IN); Anant Kansal, Bangalore (IN); Manjit Rath, Bangalore (IN); Saurabh Singh, Bangalore (IN); Tushar Vyas, Bangalore (IN); Sanchit Sanga, Bangalore (IN); Prabhvir Sahmey, Bangalore (IN); Bolin Bolin, Bangalore (IN); Cvl Srinivas, Bangalore (IN); Shivprasanth Shivaprasanth, Bangalore (IN); Apama Sharma, Bangalore (IN); Balakuntla Maheshkumar Gurucharan, Bangalore (IN); Rajendra Dwivedi, Bangalore (IN); Mohammad Mohammad, Bangalore (IN); Vikas Minda, Bangalore (IN)

(73) Assignee: Surewaves Mediatech Private Limited, Bangalore, Karnataka (IN)

( * ) Notice: Subject to any disclaimer, the term of this patent is extended or adjusted under 35 U.S.C. 154(b) by 258 days.

(21) Appl. No.: 12/741,218

(22) PCT Filed: Nov. 4, 2008

(86) PCT No.: PCT/IN2008/000747
§ 371 (c)(1),
(2), (4) Date: Aug. 9, 2010

(87) PCT Pub. No.: WO2009/057158
PCT Pub. Date: May 7, 2009

(65) Prior Publication Data
US 2011/0035468 A1    Feb. 10, 2011

(30) Foreign Application Priority Data
Nov. 4, 2007    (IN) ............................. 251CHE/2007

(51) Int. Cl.
*G06F 15/177*    (2006.01)
(52) U.S. Cl.
USPC ........................................................ 709/222
(58) Field of Classification Search
USPC ...................... 709/208–211, 220–229, 250; 455/41.1–41.2
See application file for complete search history.

(56) References Cited

U.S. PATENT DOCUMENTS

| | | | |
|---|---|---|---|
| 2002/0164952 A1* | 11/2002 | Singhal et al. ................ | 455/41 |
| 2006/0025075 A1* | 2/2006 | Chung et al. ................. | 455/41.2 |
| 2006/0122848 A1* | 6/2006 | Takagi ............................ | 705/1 |
| 2009/0037594 A1* | 2/2009 | Sever et al. ................... | 709/230 |
| 2009/0054058 A1 | 2/2009 | Andreasson et al. | |

* cited by examiner

*Primary Examiner* — Brendan Higa
(74) *Attorney, Agent, or Firm* — Barry Choobin; Patent360 LLC

(57) ABSTRACT

System and method for creating networked short range zone through remote delivery of short range proxy server on a remotely located machine, the method comprising the steps of registering with the system network, receiving a unique ID, accessing the server for further processing, downloading the relevant application with enabling means, connecting a device to short range dongles, running the application and registering the device using the unique ID, entering the location based and/or other relevant information, enabling the device for creating networked short range zone.

2 Claims, 3 Drawing Sheets

Figure 1:
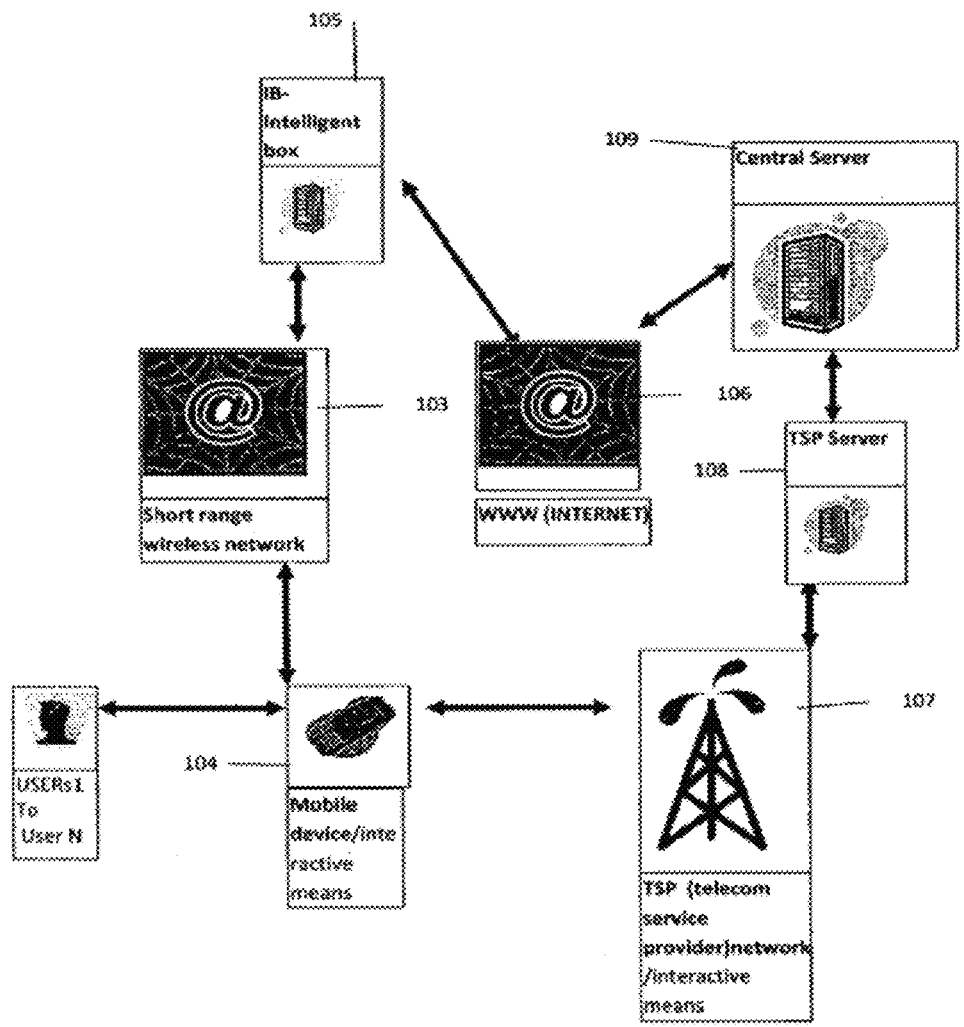

SYSTEM AND METHOD FOR CREATING NETWORKED SHORT RANGE ZONE THROUGH REMOTE DELIVERY OF SHORT RANGE PROXY SERVER ON A REMOTELY LOCATED MACHINE

This invention is a divisional out of the original Patent Application No. 2516/CHE/2007 dated Nov. 4, 2007.

FIELD OF THE INVENTION

The present invention relates to a system and method for creating networked short range zone through remote delivery of short range proxy server on a remotely located machine. More particularly, the present invention relates to a system and method for creating a short range communication network such as Bluetooth and/or the like around a user's device.

SUMMARY OF THE INVENTION

A system and method for creating networked short range zone through remote delivery of short range proxy server on a remotely located machine are provided.

Another exemplary embodiment relates to a method for creating networked short range zone through remote delivery of short range proxy server on a remotely located machine, the method comprising the steps of registering with system network, receiving a unique ID, accessing the server for further processing, downloading the relevant application with enabling means, connecting a device to short range dongles, running the application and registering the device using the unique ID, entering the location based and/or other relevant information, enabling the device for creating networked short range zone.

Another exemplary embodiment relates to a method for creating networked short range zone through remote delivery of short range proxy server on a remotely located machine, further comprising the steps of connecting the plurality of other devices to networked short range zone, intimating and allowing the download of requested data/content by such other devices, pushing the customized data/content along with the requested data/content to such other devices while allowing interaction with the networked short range zone.

The method further comprising built-in tracking and activation for delivery of specific dongles with registered short range ID.

BRIEF DESCRIPTION OF ACCOMPANYING DRAWINGS

Non-limiting and non-exhaustive features of the present invention together with its objects and advantages are described with reference to the accompanying drawings, like reference numerals refer to like elements throughout the various figures unless specified otherwise and wherein:

FIG. 1. illustrates a system diagram of an environment in which the present invention may be practiced according to an embodiment of the present invention.

Figure 2:
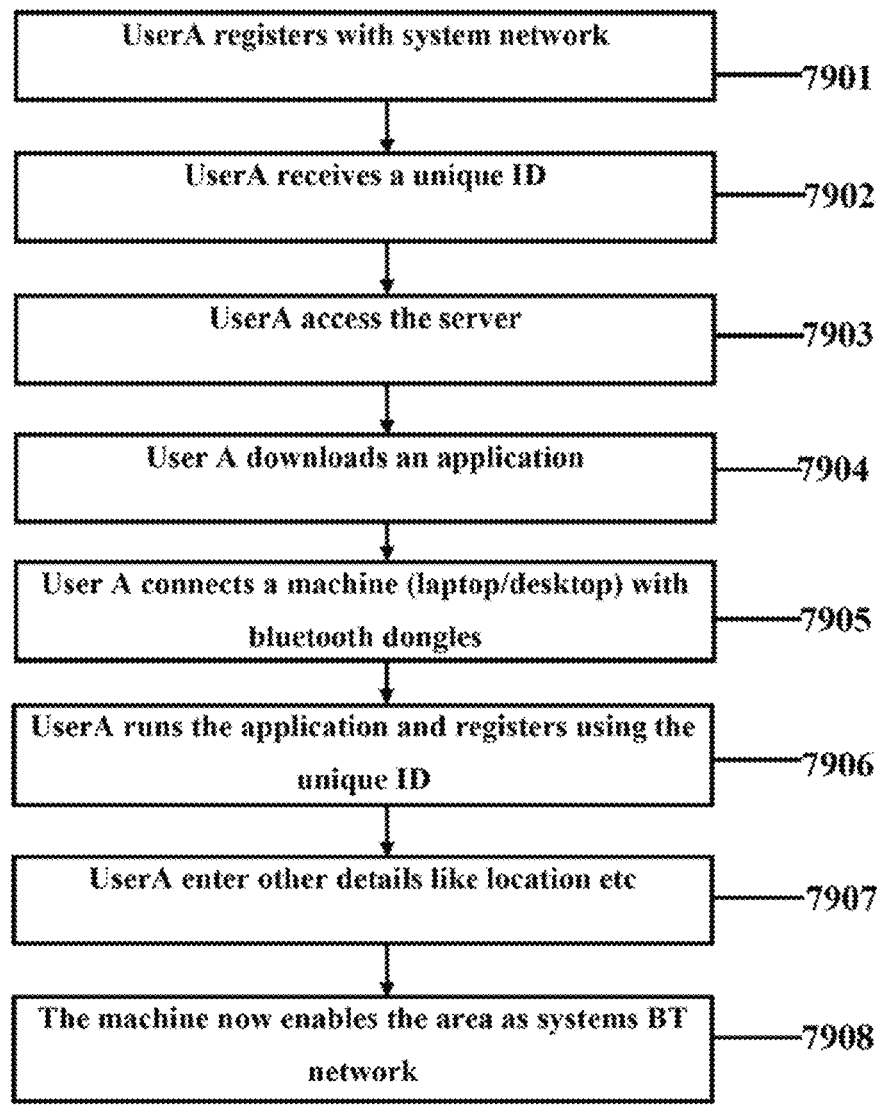
Figure 3:
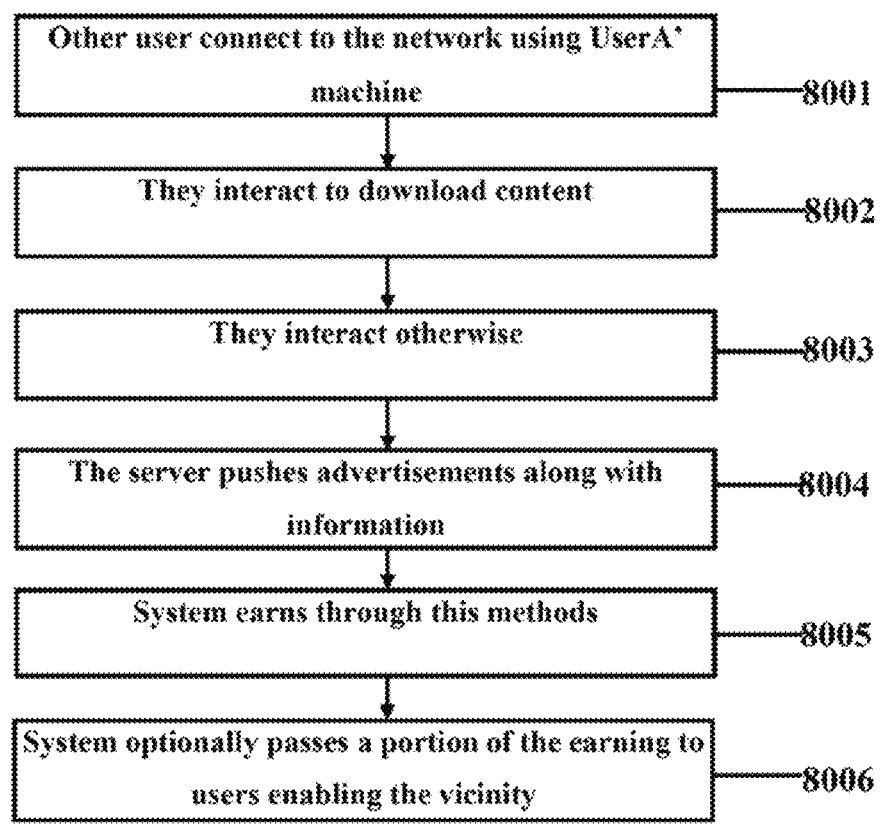

FIGS. 2 and 3 illustrate a logical flow diagram showing method for creating networked short range zone through remote delivery of short range proxy server on a remotely located machine according to preferred embodiments of the present invention.

DETAILED DESCRIPTION OF THE INVENTION

A system and method for creating networked short range zone through remote delivery of short range proxy server on a remotely located machine are provided.

In the following description for purposes of explanation, specific details are set forth in order to provide a thorough understanding of the present invention. It will be evident, however, to one skilled in the art that the present invention may be practiced without these specific details. In other instances, well known methods, procedures, components and circuits have not been described in detail so as not to obscure the present invention.

The present invention now will be described more fully hereinafter with reference to the accompanying drawings, which form a part hereof, and which show, by way of illustration, specific exemplary preferred embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

Referring to FIG. 1, it illustrates a schematic diagram of a system.

FIG. 2 illustrates a block diagram illustrating the method for creating networked short range zone through remote delivery of short range proxy server on a remotely located machine, the method comprising the steps of registering 7901 with system network, receiving 7902 a unique ID, accessing 7903 the server for further processing, downloading 7904 the relevant application with enabling means, connecting a device to short range dongles 7905, fuming 7906 the application and registering the device using the unique ID, entering 7907 the location based and/or other relevant information, enabling 7908 the device for creating networked short range zone.

FIG. 3 illustrates a method for creating networked short range zone through remote delivery of short range proxy server on a remotely located machine, comprising the steps of connecting 8001 the plurality of other devices to networked short range zone, intimating and allowing the download 8002 of requested data/content by such other devices, pushing the customized data/content 8003, 8004, 8005. 8006 along with the requested data/content to such other devices while allowing interaction with the networked short range zone.

Thus the method and system of the present invention enable revenue generation opportunity to the user of created networked short range through remote delivery of short range proxy server on a remotely located machine. The user being in a created short range zone promptly receives interaction requests for downloaded of data/contents by the devices active within such created short range zone in the vicinity. Thus the system and method allows the user to feed customized data/content such as advertisement content while enabling the downloaded of requested data by other devices in the vicinity. The delivery of customized data so being transferred enables the user to earn a portion of the earning for such delivery to the devices in vicinity. Thus the system allows the user to create a short range zone around their desktops and/or any other Bluetooth enabled devices attracting requests from other devices located within such network, thereby acting as Smart-IBs at their end.

Although, the invention has been described with reference to specific examples, it would be appreciated by those skilled in the art that the invention may be embodied in many forms without departing from the broader spirit and scope of the invention as set forth in the invention. Preferred embodiments of this have been described herein, including the best mode known to the inventor for carrying out the invention. Variations of those preferred embodiments may become apparent to those of ordinary skill in the art upon reading the foregoing description.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the specification and drawings are to be regarded in an illustrative rather than a restrictive sense without departing from the spirit and scope of the invention, the invention resides in the claims hereinafter appended.

What is claimed is:

1. A method for creating a networked short range zone through a remote delivery of a short range proxy server on a remotely located machine, the method comprising the steps of:
   registering with a system network by a user;
   receiving a unique ID by the user;
   detecting a mobile device entering a network by a short range proxy server;
   sending an alert to the mobile device by the short range proxy server, and wherein the alert requests the mobile device to download an application;
   accepting the request to download the application by the user;
   downloading the application to the mobile device;
   connecting the mobile device to a plurality of short range dongles, and wherein the plurality of short range dongles are Bluetooth dongles;
   running the application at the mobile device and registering the mobile device using the unique ID;
   entering a location based information at the mobile device by the user;
   activating the mobile device for creating a network short range zone by running the downloaded application, and wherein the downloaded application is stored with a wireless technology;
   tracking and activating specific short range dongles having registered short range IDs;
   delivering a customized data content and a requested data or content to a plurality of mobile device that are within the created short range network, using the registered short range IDs, after receiving an interaction request for downloading the data or content.

2. The method as claimed 1, wherein the short range zone comprise a short range communication network and wherein the short range communication network is a Bluetooth network.

* * * * *